(12) United States Patent
Englebert

(10) Patent No.: US 9,598,968 B2
(45) Date of Patent: Mar. 21, 2017

(54) ATTACHING THE BLADES TO THE DRUM OF AN AXIAL TURBOCOMPRESSOR

(71) Applicant: Techspace Aero S.A., Herstal (Milmort) (BE)

(72) Inventor: Eric Englebert, Villers-le-Bouillet (BE)

(73) Assignee: Safran Aero Boosters SA (BE)

( * ) Notice: Subject to any disclaimer, the term of this patent is extended or adjusted under 35 U.S.C. 154(b) by 631 days.

(21) Appl. No.: 14/017,961

(22) Filed: Sep. 4, 2013

(65) Prior Publication Data
US 2014/0079552 A1 Mar. 20, 2014

(30) Foreign Application Priority Data
Sep. 11, 2012 (EP) .................................... 12183813

(51) Int. Cl.
*F01D 5/30* (2006.01)
*F04D 29/32* (2006.01)

(52) U.S. Cl.
CPC .......... *F01D 5/3007* (2013.01); *F01D 5/3023* (2013.01); *F01D 5/3053* (2013.01); *F04D 29/322* (2013.01); *Y02T 50/672* (2013.01); *Y02T 50/673* (2013.01)

(58) Field of Classification Search
CPC .... F01D 5/3007; F01D 5/3023; F01D 5/3053; F04D 29/322; Y02T 50/672; Y02T 50/673
See application file for complete search history.

(56) References Cited

U.S. PATENT DOCUMENTS

| 2,685,405 A | | 8/1954 | Stalker | |
| 2,944,326 A | * | 7/1960 | Stadthaus | B21K 25/00 228/136 |
| 3,309,058 A | * | 3/1967 | Blackhurst | F01D 5/3007 415/200 |
| 3,385,512 A | | 5/1968 | Bandukwalla | |
| 3,446,480 A | * | 5/1969 | Emmerson | F01D 5/08 416/232 |
| 3,501,247 A | * | 3/1970 | Tournere | C04B 35/71 415/189 |

(Continued)

FOREIGN PATENT DOCUMENTS

| EP | 2400160 A1 | 12/2011 |
| FR | 1537338 A | 8/1968 |

(Continued)

OTHER PUBLICATIONS

International Search Report from corresponding EP 12 183 813.0 filed Sep. 11, 2012.

*Primary Examiner* — Thomas Denion
*Assistant Examiner* — Matthew T Largi
(74) *Attorney, Agent, or Firm* — Polster Lieder

(57) ABSTRACT

The invention relates to the design of rotor blades of an axial turbomachine compressor, especially the method of attaching the blades to the rotor. The blades comprise an aerofoil portion and a platform for attaching them to the rotor. The platform comprises, along the main axis of the blade, a first layer forming a surface bounding the fluid stream and skirting the aerodynamic surfaces and a second layer, underneath the first layer with respect to the aerodynamic surfaces, designed to be able to mate with the inner face of a wall of the rotor around an aperture in the rotor for the purpose of attaching it.

14 Claims, 3 Drawing Sheets

(56) References Cited

U.S. PATENT DOCUMENTS

| | | | | |
|---|---|---|---|---|
| 5,137,420 A | * | 8/1992 | Sigworth | F01D 5/3007 |
| | | | | 415/170.1 |
| 5,378,110 A | * | 1/1995 | Ress, Jr. | F01D 5/02 |
| | | | | 416/229 R |
| 2009/0324394 A1 | * | 12/2009 | Weaver | F01D 11/001 |
| | | | | 415/173.7 |
| 2011/0318185 A1 | * | 12/2011 | Wery | F01D 5/3023 |
| | | | | 416/214 A |

FOREIGN PATENT DOCUMENTS

| | | | | |
|---|---|---|---|---|
| FR | 1542561 A | | 9/1968 | |
| GB | 572859 A | * | 10/1945 | F01D 5/03 |
| GB | 599391 A | | 3/1948 | |
| GB | 1068681 A | | 5/1967 | |

* cited by examiner

ATTACHING THE BLADES TO THE DRUM OF AN AXIAL TURBOCOMPRESSOR

CROSS-REFERENCE TO RELATED APPLICATIONS

This application claims the benefit, under 35 U.S.C. §119, of EP 12183813.0, filed Sep. 11, 2012, the disclosure of which is incorporated herein by reference in its entirety.

FIELD

The invention relates to rotor blades of an axial turbomachine, more particularly to the compressor of an axial turbomachine. The invention relates to attaching these blades to the rotor of the turbomachine. The invention also relates to the rotor of a turbomachine designed to house the blades.

BACKGROUND

The statements in this section merely provide background information related to the present disclosure and may not constitute prior art.

U.S. Pat. No. 3,385,512 A discloses a bladed rotor of an axial turbomachine compressor. The rotor comprises a drum supporting a plurality of blade rows. The drum comprises a mounting recess for each row of blades. A number of blades are arranged on a common carrier forming a segment. The latter is fixed to the rotor by insertion in the corresponding recess in the drum. The carrier comprises on its lower face, i.e. opposite the actual blades, a massive rib capable of being inserted into the recess in the drum. The rib comprises a groove on each of its opposite faces. The recess in the drum comprises two leaf springs extending circumferentially in the respective grooves in the recess of the drum. When inserting the carrier common to several blades, the front side of the rib comprises tapered faces surfaces designed to come into contact with the leaves and to slide along the latter so as to push them into their respective grooves against the elastic forces generated by their movement. Once the lateral grooves in the rib are opposite the leaves, then the latter may enter it by virtue of the elastic force they exert. The leaves, once in place, then straddle the corresponding recesses of the blade carrier and the drum, thus ensuring the blades are attached to the rotor. This method of attaching is of interest but has some drawbacks. It requires a significant amount of material in the carrier and the drum, which greatly affects the resulting mass of the engine and, more importantly, greatly increases the centrifugal forces, which limits the diameter and maximum speed of the drum.

U.S. Pat. No. 2,944,326 A discloses a technique for attaching the blades of an axial turbomachine compressor to the rotor. The blades have a platform, reduced in size, whose cross section has a wedge-shaped profile. A groove is formed by coining each side face of the platform. The rotor wall comprises one aperture per blade, the profile of the aperture corresponding to that of the blade platform. Each blade is then inserted into an aperture in the rotor from which it is prevented from exiting in one direction because of the conical or wedge-shaped profile of the platform and of the aperture housing it. Press tools, such as a punch and a die are then used to exert high pressure on the face of the rotor directly adjacent to the edges of the aperture corresponding to the lateral grooves in the platform. The objective of this operation is to push back the material forming the aperture to the inside of the lateral grooves in the platform to ensure its grip, particularly in the direction opposite to that mentioned. The blade is thus held firmly in both directions radially with respect to the rotor. This method of attaching is of interest but has some drawbacks. It requires the rotor to be extremely thick at the point where it is attached to the blades. The principle of mounting the blades with a conical profile platform can only work with a certain thickness of material. This is also true in order to push back the material in a lateral groove. This method of attachment is not suitable for light drums which consist essentially of a thin wall forming the web of the drum.

U.S. Pat. No. 2,685,405 A discloses a bladed rotor of an axial compressor, in which the blades are hollow and in fluid communication with the rotor. Each blade comprises a platform forming a mounting recess. The rotor consists of several sections joined to each other. The mounting of the blades on the rotor is provided by two contiguous rings for each blade row. Each of these two rings has an edge with cut-outs matching the corresponding half of the profile of the mounting recess for the blades. The recesses and the blades are sandwiched between two mounting rings, the latter being mechanically attached to the remainder of the rotor. This type of rotor is designed for the rotor stages to be in fluid communication. As with the previously detailed interpretations, this type of installation requires a great deal of material. Furthermore, it requires the manufacture of numerous components and considerable effort to assemble.

SUMMARY

The aim of the present invention is to provide a simple and lightweight way of attaching the blades of an axial turbomachine to a rotor. More particularly, the invention aims to provide a lightweight and simple method of attaching the blades to a compressor drum.

The invention relates to a rotor blade of an axial turbomachine, comprising a platform for attaching the rotor, two aerodynamic surfaces opposite each other and extending from the platform along the main axis of the blade, a surface bounding the fluid stream and skirting the aerodynamic surfaces, and a second layer located below a first layer relative to the aerodynamic surfaces, for the attachment of the blade. The second layer of the platform is configured to mate with the inside face of a rotor wall located around an aperture of the rotor for the purpose of attaching it.

According to an advantageous embodiment of the invention, the second layer of the platform is configured to be able to mate directly and/or indirectly with layers of the inside face of the rotor wall located circumferentially on both sides of the aperture.

According to an advantageous embodiment of the invention, the second layer forms one or more shoulders protruding from the surface of the first layer.

According to an advantageous embodiment of the invention, the second layer extends at least substantially parallel to the first layer and protrudes from the surface of the layer to form a shoulder on each of its edges.

According to an advantageous embodiment of the invention, the second layer protrudes from the lower face of the first layer and comprises a means of retention, such as an aperture oriented circumferentially relative to the rotor, capable of engaging mechanically with an elongated means of attachment designed to be in contact with the inner surface of the wall.

According to an advantageous embodiment of the invention, the lower surface of the first layer skirts the second layer and forms a support surface on the platform on a corresponding surface of the rotor wall.

The invention also relates to a bladed rotor on an axial turbomachine, whereby the blades are in accordance with the features described herein.

According to an advantageous embodiment of the invention, the rotor comprises an annular part of the wall having a row of blade mounting apertures, wherein that part of the wall is integral.

According to an advantageous embodiment of the invention, the rotor structure is substantially made up of a wall forming a circular web, the annular part of the wall being raised relative to the web immediately upstream and/or downstream of the annular part of the wall, the annular part of the wall corresponding to a single blade row and the web comprising at least one annular rib designed to substantially seal against the inner surface of an inner shell of a stator blade stage.

According to an advantageous embodiment of the invention, the wall includes at least one connecting layer extending mainly radially between the wall forming the shell and the annular part of the wall.

According to an advantageous embodiment of the invention, the blades are in accordance with the features described herein and the shape of the mounting apertures of the annular part of the wall correspond with that of the first layer of the blade platform, and the boundary surfaces of the fluid stream of the layer are flush with the outer surface of the annular part of the wall.

According to an advantageous embodiment of the invention, the rotor comprises a means of pressure acting on the inner face of the blade platforms to keep them in place, the means comprising at least a snap ring and/or a strip formed annularly.

According to an advantageous embodiment of the invention, the rotor comprises a means of bonding, such as glue, between the blade platform shoulders and the rotor wall.

According to an advantageous embodiment of the invention, the mounting apertures of the annular part of the wall and the blades, in particular their aerodynamic surfaces, are constructed to enable the blades to be inserted through the apertures from the interior of the rotor for the purpose of fixing them.

According to an advantageous embodiment of the invention, the outer face of the annular part of the wall comprises a cavity around each mounting aperture designed to house the first layer of the blade platform, the second layer of the blade platform passes through the aperture, and the means for attachment, such as one or more snap rings, mate with the means of retention of the blade platforms and with the interior surface of the part of the wall, the means being arranged annularly.

The steps of the invention enable an advantageous means, i.e., method and system, for attaching the blades of a turbomachine to the rotor. This means of assembly has the advantage in that it allows the blades and the rotor to be made of different materials especially where it is not possible to carry out welding operations between the two. The type of assembly also has the advantage that it is very light. It is compatible with a drum-shaped rotor, i.e. essentially consisting of a thin wall forming an ogival or drum-shaped shell, especially equipped with raised annular parts of the wall. These parts have the dual advantage of stiffening the drum and compensating for the difference in height required to accommodate the internal shells of the stator blades. The blades in accordance with the invention are particularly suited to this type of rotor. They make use of the raised parts of the wall designed for housing the blades for attaching them without requiring the addition of any material or reinforcement.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

Figure 1:
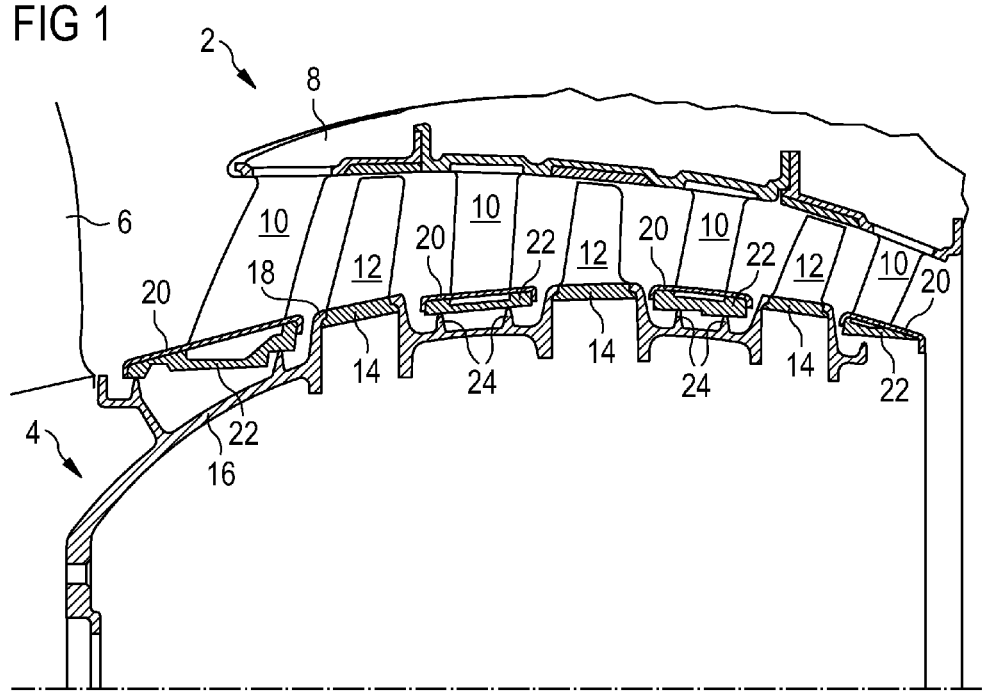
FIG. 1 is a partial sectional view of the low-pressure compressor section of an axial turbomachine of a jet engine, the blades and the rotor being in accordance with various embodiments of the invention.

The following description is merely exemplary in nature and is in no way intended to limit the present teachings, application, or uses. Throughout this specification, like reference numerals will be used to refer to like elements.

FIG. 1 shows the front of an axial turbomachine 2 of a jet engine. This shows the inlet fan 6 mounted on the rotor 4. Directly downstream from the fan 6 is the splitter nose 8 of the airflow passing through the fan 6. The flow in question is divided into a primary flow through the various compression stages of the compressor, and a secondary stream outside the primary stream and the compressor. The compressor comprises a series of stator stages made up of stator blades 10. The rotor 4 supports a series of rows of rotor blades 12, each row of rotor blades 12 forming, together with the row of stator blades 10 located directly downstream, a compression stage of the compressor.

The rotor 4 is a drum formed mainly of a wall 16 symmetrical in revolution about its axis of rotation. The wall forms a shell corresponding to the general shape of an ogival drum. However, it has raised parts 18 corresponding to the rows where the rotor blades 12 are fixed. These raised annular parts 18 enable the rotor blades 12 fixed there to expose their platforms 14 defining the primary flow through the compressor along the rotor wall 16 up to the internal shells 20 of the adjacent stator vanes 10. The shells 20 are supported by the stator blades 10 and include an abradable material 22 substantially providing a seal with the lip seals 24 on the wall 16 of the rotor 4.

The raised parts 18 of the wall 16 comprise apertures into which the rotor blades 12 are inserted and held. Each rotor blade 12 comprises a platform 14 designed to mate with the inner or inside surface of the part of the wall 18 directly at the edge of the aperture in question. In fact, as can be seen in FIG. 1, the platforms 14 of the rotor blades 12 comprise a lower layer forming a shoulder on the upstream and downstream edges, these shoulders coming into contact with the inner surface of the wall. The shoulders provide mechanical retention of the rotor blades 12 in a radial direction. The shoulders can also be present on other edges of the platform 14, i.e. circumferentially at the edges, that are not visible in FIG. 1 because FIG. 1 is a longitudinal sectional view of the rotor 4.

The rotor blades 12 are thus positioned by insertion from inside the rotor drum. The rotor blade aerofoil is first inserted into the corresponding aperture and then the platform is positioned by inserting the platform into the aperture with the retaining layers contacting the inner surface of the rotor wall. The rotor blades 12 can also be held in place by other means such as gluing. The shape of the retaining platforms 14 ensures radial retention of the rotor blades 12 in the direction corresponding to those of the centrifugal forces. During rotation, these forces are so large that they offset the other forces acting on the rotor blades 12, such as the aerodynamic forces and the forces related to the blade's own weight. When stopped or even at low speeds, the centrifugal forces are zero or small and it is therefore important that the rotor blades 12 are secured by other means. The forces to which the rotor blades 12 are subjected in these conditions are, however, significantly lower than the forces associated with the centrifugal forces.

Note that the rotor blade platforms 14 and the housing apertures in the rotor wall 18 can be sized so that there is a tight fit between the two. In such instances, the edges of the platform 14 and/or those of the apertures in the wall 18 can be tapered to ensure clamping when the rotor blades 12 are being fitted.

Figure 2:
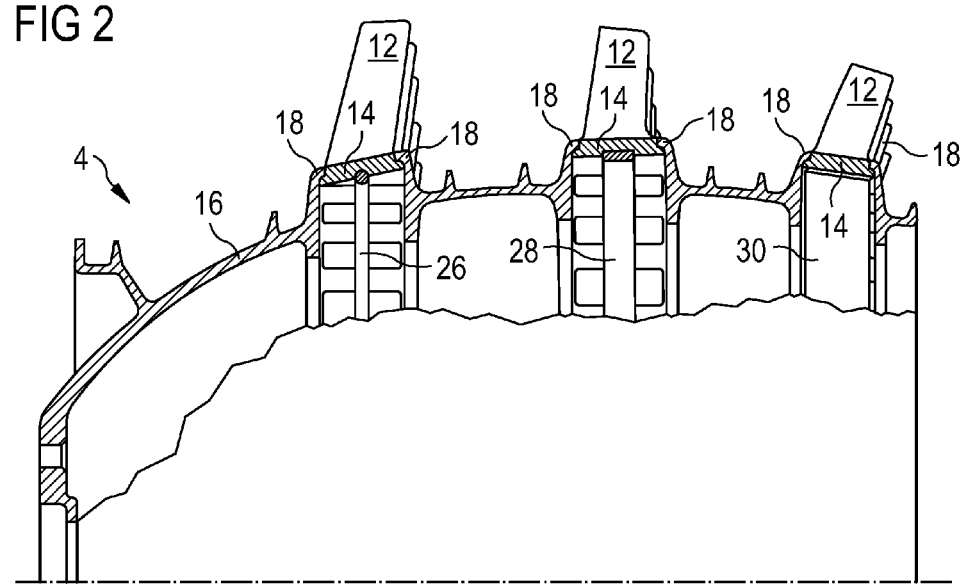
FIG. 2 is a sectional view of the rotor of the turbomachine of FIG. 1, showing the alternative methods of attachment of the rotor blades, according to various embodiments of the invention.

FIG. 2 shows variants of the way the rotor blades 12 are attached to the rotor wall 16, in accordance with various embodiments of the invention. FIG. 2 shows only the rotor in section.

In such embodiments, the first rotor blade row 12 is held in place by a snap ring 26 of circular cross-section accommodated in correspondingly shaped grooves on the inner sides of the rotor platforms 14. In various implementations, the snap ring 26 is made of an elastic metallic material, such as spring steel and is configured so that it is in a state of stress once in place so as to exert forces on the platforms 14, these forces being directed substantially radially outward from the rotor 4.

Additionally, the second rotor blade row 12 is also held in place by a snap ring 28 that is substantially rectangular in section. The snap ring 28 is also housed in grooves of corresponding shape formed on the inner sides of the platforms 14 and is also configured to be in a stressed state when in place supporting the platforms 14.

Furthermore, the third rotor blade row 12 is held in place by a strip 30 extending over the major part of the length of the blade platforms 14. Given the width of the strip, corresponding grooves are not necessary.

The means of attachment shown in FIG. 2 are examples and can be combined with each other or with other means such as bonding and/or clamping.

Figure 3:
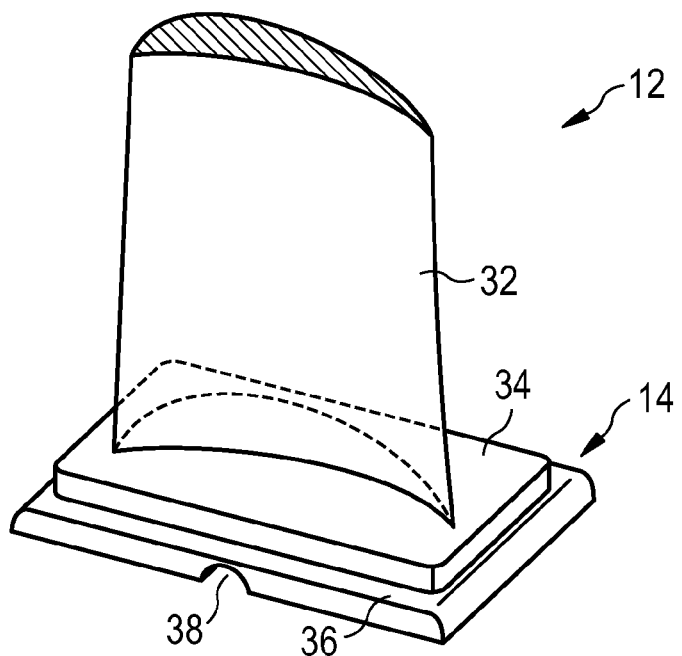
FIG. 3 is a perspective view of an exemplary embodiment of a blade in accordance with the various embodiments of the invention.

FIG. 3 is a perspective illustration of a rotor blade 12 of the various embodiments of the invention in FIGS. 1 and 2. The rotor blade 12 consists essentially of an aerodynamic layer 32 and a platform 14. The latter comprises a first upper layer 34 forming a surface of the fluid stream and skirting the aerodynamic layer 32. This surface can be parallelogram-shaped, or more specifically, of rectangular shape and its thickness corresponds largely to that of the raised part 18 of the wall 16 (FIGS. 1 and 2) of the rotor 4, more particularly the thickness of the rotor wall 16 immediately at the edge of the aperture housing the rotor blade 12. The platform 14 also includes a second layer 36 located directly below the first layer 34. The second layer 36 covers the extent of the first layer 34 and forms a shoulder on at least two opposite edges of the first layer 34. As shown if FIG. 3, the second layer 36 forms shoulders on the four edges of the first layer 34. These shoulders are designed to come into contact with the inner surface of the wall 16, at the edge of the aperture housing the rotor blade 12.

A groove 38 with a circular cross section is formed transversely on the inner face of the platform 14, in this case on the inside of the second layer 36. The groove 38 is designed to mate with a circular snap ring, such as the snap ring 26, shown on the first rotor row of FIG. 2.

The second layer 36 of the blade platform 14 can take many forms as long as it provides a means of mechanically retaining the rotor blades 12. In fact, instead of covering the extent of the first layer, the second layer 36 may be limited to legs that define the shoulders.

The upstream and downstream edges of the second layer 36 have curved surfaces conforming to the profile of the inside surface of the wall 16 with which they come into contact.

The blade platform 14 and that part of the rotor wall 16 mating with the rotor blades 12 are configured such that the surface of the first layer 34 forming the surface of the fluid stream is flush with the outer surface of the part of the wall 16.

Figure 4:
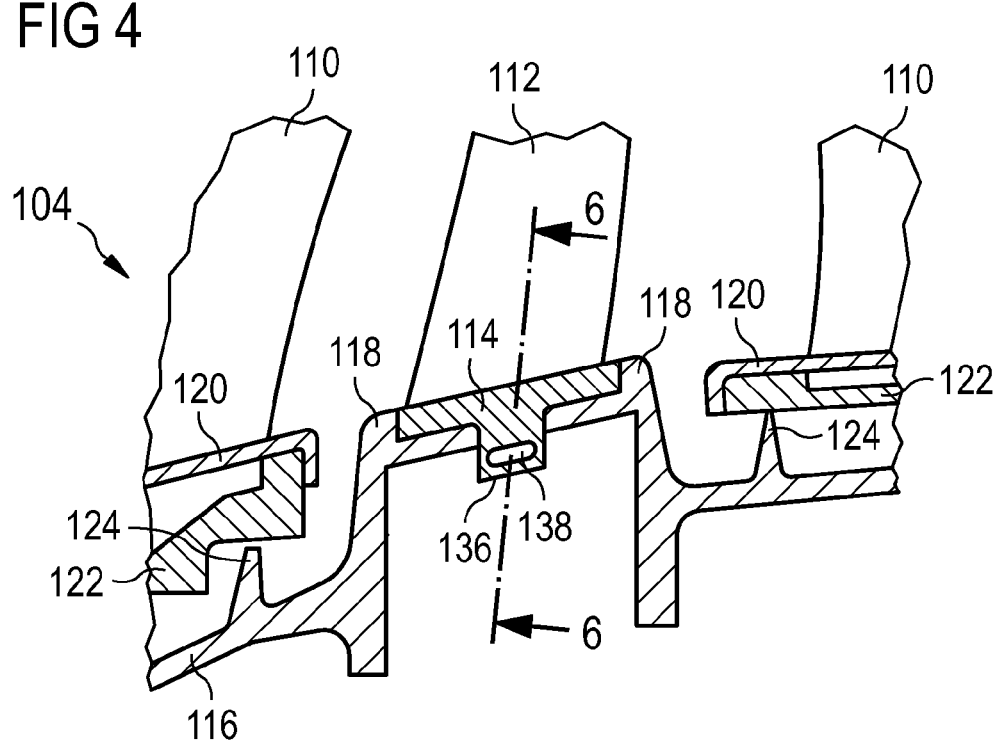
FIG. 4 is a partial sectional view of an axial turbomachine rotor in accordance with various embodiments of the invention.
Figure 5:
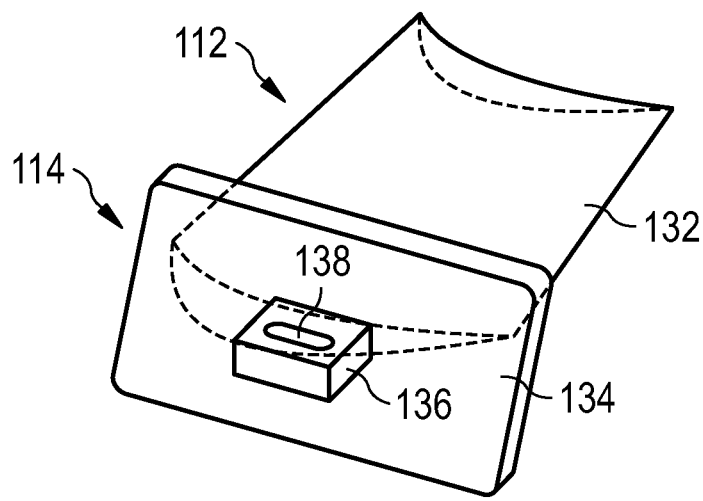
FIG. 5 is a perspective view of the rotor blade in FIG. 4, in accordance with various embodiments of the invention.
Figure 6:
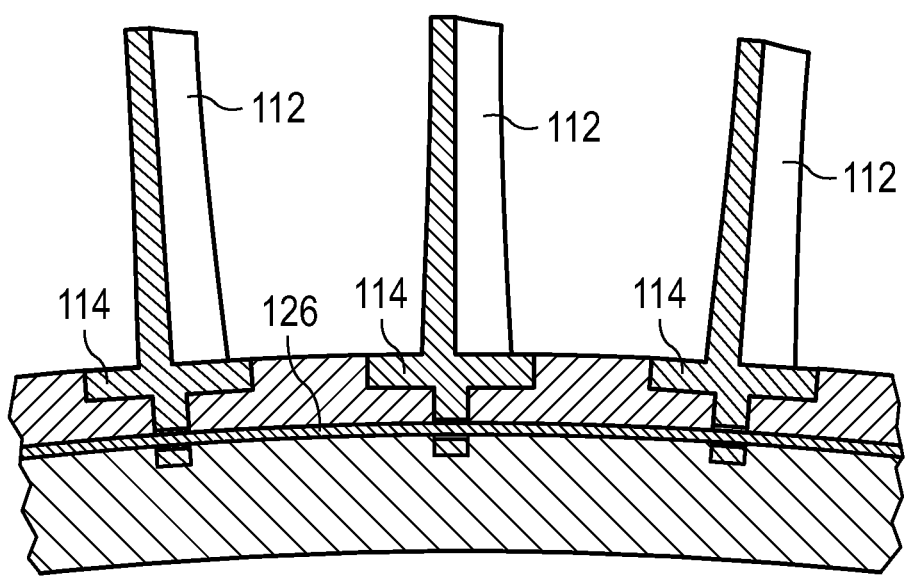
FIG. 6 is a sectional view of the bladed rotor of FIG. 4, sectioned at 6-6, in accordance with various embodiments of the invention.

FIGS. 4 to 6 illustrate various other embodiments of the invention. FIG. 4 is a partial sectional view of an axial turbomachine rotor, showing the fitting of a rotor blade 112 on its wall. FIG. 5 is a perspective view of the rotor blade 112 shown in FIG. 4. FIG. 6 is a view of the bladed rotor of FIG. 4 sectioned at 6-6.

The reference numbers of the embodiments in FIGS. 1 to 3 are also used in embodiments shown in FIGS. 4 to 6, for the same or corresponding parts. However, these numbers are all increased by 100. For identical parts, the reference numbers refer to those of FIGS. 1 to 3.

The rotor 104 shown in FIG. 4 is similar to that in FIGS. 1 and 2. However, it differs in the raised part 118 of the wall 116 housing the blades 112. Instead of having holes of substantially constant section, the raised part 118 of the wall 116 here comprises a cavity whose cross-section corresponds largely to that of the platform, and an aperture smaller than that of the cavity.

The platform 114 of the rotor blade 112 includes a first layer 134, similar to the first layer 34 of the platform 14 (see FIG. 3). The platform 114 also includes a second layer 136 located directly below the first layer 134. The second layer 136 extends from the bottom of the first layer 134 so as to protrude. The second layer 136 is designed to pass through the aperture in the raised part 118 of the wall 116 so as to attach the rotor blade 112. The second layer 136 includes an aperture 138 designed to mate with a means of attachment bearing on the inner face of the part of the wall 118. The aperture 138 is oriented circumferentially in the rotor. FIG. 6 shows a snap ring 126 passing through the apertures 138 of several adjacent blade platforms 114 in a rotor blade row. The snap ring 126 can extend over the entire circumference, forming a plurality of turns or can be segmented so as to mate with only a smaller number of rotor blades 112 in a row.

The second layer 136 protruding from the underside of the first layer 134 can take other forms than those shown in FIGS. 4 to 6. The same is true for the means of retention on the second layer 136. The aperture 138 can take other forms, including being oriented differently. It is also possible to provide several aperture in the second layer 136. The means of retention can also be formed by a suitable exterior profile of the second layer 136. The latter can, for example be a T-profile with which a snap ring or a correspondingly shaped locking bar can mate to ensure retention of the rotor blade 112 on the rotor 104.

Additionally, a means of clamping designed to exert a tensile force on the second layer 136 can be provided and can be integrated into the means of attachment (in this case the snap ring 126 in the example of FIGS. 4 to 6) mating with the means of retention (aperture 138 in this case). The means of attachment can have a taper on at least one contact surface with the second layer 136 of the platform so as to exert a tractive force on the second layer 136 when positioning the means of fixing. Alternatively, or additionally, the means of clamping can act as a support for the means of fixing on the inner face of the wall.

The rotor blades 12/112 of the invention, can be manufactured in a material different from that of the rotor 4/104. In particular, the rotor blades 12/112 can be manufactured in a composite material, in particular a composite material with an organic matrix. The rotor 4/104 itself can be made of a metallic material such as titanium. The bladed rotor can thus be very light while providing optimum blade attachment, particularly suited to compensate for any differential expansion between the materials used.

Blades made of a composite material can also include one or more metallic inserts, particularly in the second platform layer which can, in some cases, be subject to significant pressure, including during operation of the turbomachine.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A bladed rotor of an axial turbomachine, said bladed rotor comprising:
   a wall forming a circular web, at least one annular portion of the wall being raised relative to the web immediately at least one of upstream and downstream of the at least one annular portion of the wall, the at least one annular portion of the wall being provided with a row of blade mounting apertures;
   a plurality of rotor blades, each rotor blade comprising:
      a platform; and
      two aerodynamic surfaces opposite each other and extending from the platform along a main axis of the blade;
      the platform comprising, along the main axis of the blade,
         a first portion forming a surface bounding a fluid stream and skirting the aerodynamic surfaces, and
         a second portion located below the first portion relative to the aerodynamic surfaces and designed for attaching the blade; wherein the second portion of the platform mates with an inner face of the annular portion of the wall of the rotor around one of the mounting apertures; and
the second portion forms one or more shoulders projecting from the surface of the first portion; and
an element, in each of the least one annular portion of the wall, for exerting pressure on the inner face of the platforms of the rotor blades to hold them in place.

2. The bladed rotor in accordance with claim 1, wherein the second portion of the platform is designed to be able to mate directly with portions of the inner surface of the wall of the rotor located circumferentially on both sides of the aperture.

3. The bladed rotor in accordance with claim 1, wherein the second portion extends at least substantially parallel to the first portion and protrudes from the surface of the first portion to form a shoulder on each of its edges.

4. The bladed rotor in accordance with claim 1, wherein, the wall portion is integral.

5. The bladed rotor in accordance with claim 1, wherein the web comprises at least one annular rib designed to mate sealingly with an inner surface of an inner shell of a stator blade stage.

6. The bladed rotor in accordance with claim 1, wherein the wall comprises at least one connecting portion extending mainly radially between the wall forming the web and the annular portion of the wall.

7. The bladed rotor in accordance with claim 1, wherein the shape of the mounting apertures in the annular portion of the wall corresponds to that of the first portion of the platform of the blades and the boundary surfaces of the fluid stream of the first portion are flush with the outer surface of the annular portion of the wall.

8. The bladed rotor in accordance with claim 1, wherein the second portion extends at least substantially parallel to the first portion and protrudes from the surface of the portion to form a shoulder on each of its edges, the shape of the mounting apertures in the annular portion of the wall corresponds to that of the first portion of the platform of the blades and the boundary surfaces of the fluid stream of the first portion are flush with the outer surface of the annular portion of the wall.

9. The bladed rotor in accordance with claim 1, wherein the or each of the elements for exerting pressure comprises at least one of:
   at least one snap ring, and
   at least one strip arranged annularly.

10. The bladed rotor in accordance with claim 1, further comprising a bonding material between the shoulders of the platforms of the blades and the wall of the rotor.

11. The bladed rotor in accordance with claim 10, wherein the bonding material comprises glue.

12. The bladed rotor in accordance with claim 1, wherein the mounting apertures in the annular portion of the wall and the blades are designed so as to allow the insertion of the blades through the apertures from inside the rotor for the purpose of fixing them.

13. A bladed rotor of an axial turbomachine, said bladed rotor comprising:
   a wall forming a circular web, an annular portion of the wall being raised relative to the web immediately at least one of upstream and downstream of the annular portion of the wall, the annular portion of the wall being provided with a row of blade mounting apertures;
   a plurality of rotor blades, each rotor blade comprising:

a platform; and two aerodynamic surfaces opposite each other and extending from the platform along a main axis of the blade;

the platform comprising, along the main axis of the blade, a first portion forming a surface bounding a fluid stream and skirting the aerodynamic surfaces, and a second portion located below the first portion relative to the aerodynamic surfaces and designed for attaching the blade; wherein the second portion protrudes from a lower face of the first portion and comprises an aperture oriented circumferentially relative to the rotor capable of mechanically engaging with a snap ring designed to come into contact with an inner surface of the wall, and wherein a lower surface of the first portion bypasses the second portion and forms a support surface on the platform on a corresponding surface of the wall of the rotor.

14. The bladed rotor in accordance with claim 13, wherein the outer surface of the annular portion of the wall comprises a cavity around each mounting aperture designed to house the first portion of the platform of the blades, the second portion of the platform of the blades extending through the aperture, and the snap ring mates with the apertures of the platforms of the blades and the inner surface of the portion of the wall, the snap ring being arranged annularly.

\* \* \* \* \*